K. E. PEILER.
APPARATUS FOR FEEDING MOLTEN GLASS.
APPLICATION FILED JULY 17, 1920.

1,405,936.

Patented Feb. 7, 1922.

INVENTOR
KARL E. PEILER
BY
ATTORNEY.

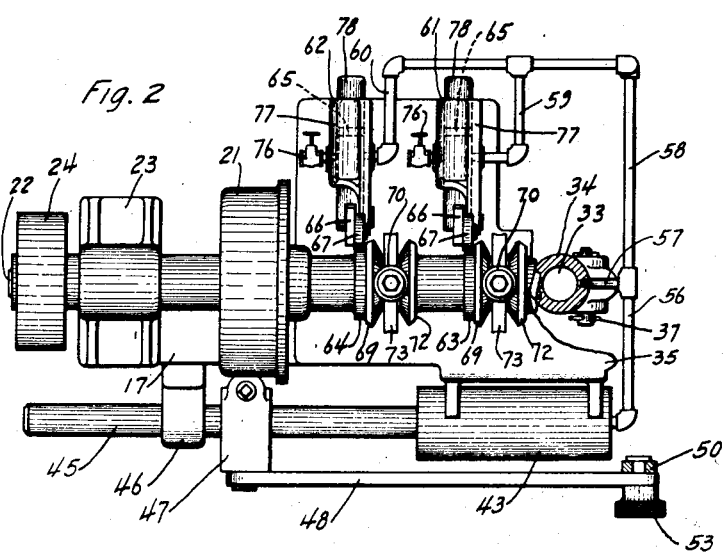

UNITED STATES PATENT OFFICE.

KARL E. PEILER, OF WEST HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR FEEDING MOLTEN GLASS.

1,405,936.  Specification of Letters Patent.  Patented Feb. 7, 1922.

Application filed July 17, 1920. Serial No. 396,935.

*To all whom it may concern:*

Be it known that I, KARL E. PEILER, a citizen of the United States, residing at West Hartford, in the county of Hartford and State of Connecticut, have invented new and useful Improvements in Apparatus for Feeding Molten Glass, of which the following is a specification.

This invention relates to apparatus for feeding molten glass to the devices by which it is to be further shaped, as by molding or blowing. More specifically, the invention relates to apparatus constructed and arranged to separate and deliver a series of masses of glass of suitable size and shape to serve as mold charges to be formed into glassware.

Various machines have been provided for this purpose, in which the container for the molten glass is provided with a submerged outlet, and the flow and cessation of flow is caused by extruding and intruding impulses imparted to the glass in or near the outlet. In some of these machines, the impulses are produced by changes in the air pressure on the surface of the glass near the outlet; that is, the air above the outlet may be compressed above atmospheric pressure to cause extrusion of the glass, and reduced to a partial vacuum to cause a cessation of the extrusion, or in some cases, an intrusion of the extruded mass, or of the stub left after severance. The gather is suspended beneath the outlet, and shears are usually provided to sever the mold charge from the gather. In this way, a series of charges is formed of a size dependent in part on the pressures and their duration, of the application of the abnormal air pressures, and these charges are of uniform size and shape so long as all conditions remain constant.

It is of great advantage to have the gather shaped to conform to some extent to the shape of the mold in which the charge is to be received, and it has been discovered that the shape of the gather can be controlled by varying the rate of discharge of the molten glass to successive portions of the gather. By this method an increase in the rate of discharge increases the diameter of that portion of the gather to which it is delivered and, conversely, a decrease in the rate reduces the diameter of a corresponding part of the gather. If a uniform rate of discharge is maintained to all parts of the gather, it assumes a pear shape with an attenuated neck of the same general shape as is produced by a constant gravity discharge, which is the usual shape well known in the art. Furthermore, in order to maintain any particular size or shape of gather, it is desirable that the several parts and forces acting to form the gather shall be capable of delicate relative adjustment so as to permit variation in the rate of flow to compensate for variation in other working conditions, such as the fluidity of the glass, which are not easily controlled.

The object of the present invention is to provide an apparatus of the general character described, which will form and deliver a series of uniform mold charges of various sizes and shapes, to suit the particular ware being manufactured. To the accomplishment of this object, the features of the invention reside in such an apparatus having provision for relative adjustment of the several forces acting to form the gather. The impulses acting to form and shape the gather are produced by variation in the air pressure which controls the rate of discharge of the glass, and therefore means is provided for varying the air pressure from a condition approaching a vacuum to normal atmospheric pressure and to a condition of compression higher than atmospheric pressure. Means is also provided to permit independent adjustment of the duration of the various air pressures. By a proper adjustment of the time and amount of these pressures, mold charges of any desired shape and size may be produced, and slight adjustments may be made to counteract otherwise uncontrollable changes in conditions involved, and uniformity in the desired shape and size of the charges may be maintained.

Another object of the invention is to provide a machine for forming and separating mold charges by the use of varying air pressures in which the pressure generating devices are incorporated in a unitary structure. To this end the invention contemplates the provision of air controlled mold charge forming apparatus, in which a generator or pump is included, arranged to cause a compression or rarification of the air controlling the formation of the gather or mold charge.

A further object of the invention is to provide an apparatus of the character described, including a pump arranged to generate pressure or vacuum at desired intervals, having independent and positively actuated means for controlling the transmission of pressure from the pump to the glass. To the accomplishment of this object, the invention comprises a pump, preferably of the reciprocating type, arranged to produce compression on one stroke and vacuum on the other, together with independent positively controlled valves to control the pressures applied by the pump to the glass.

The various features of the invention, including such others as may hereafter appear, will best be understood from the following description, taken in connection with the accompanying drawings of which:—

Fig. 2 is a plan view, partly in section, of the left end of the machine shown in Fig. 1;

Fig. 3 is a section on the line 3—3 of Fig. 1; and

Fig. 4 is a detail view of an alternative form of connection between the pump and the confined air which acts to produce extruding and intruding impulses on the glass in the outlet.

Figure 1:
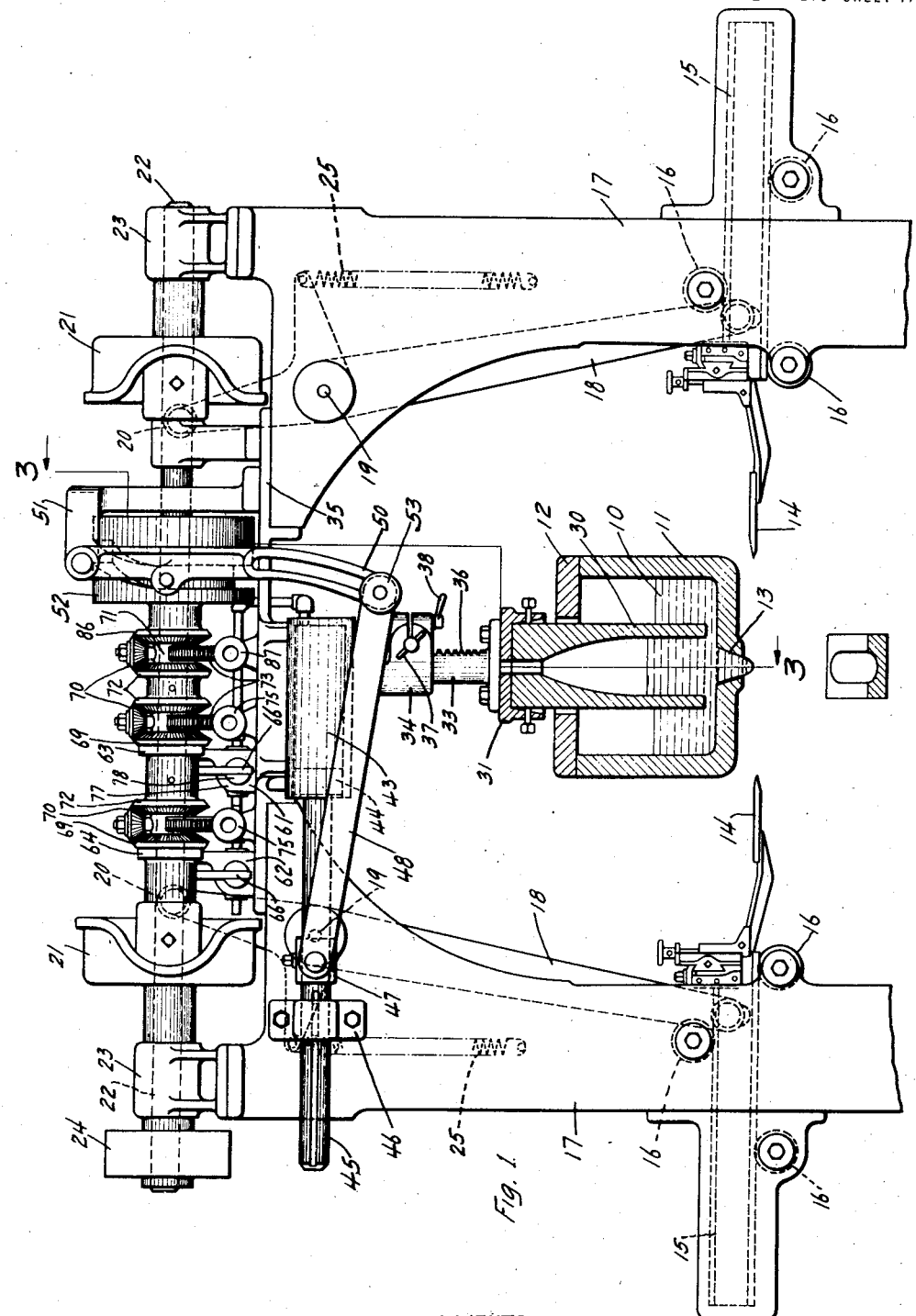
Fig. 1 is a front elevation partly in section of a glass feeding machine showing a part of the cooperating molten glass container or furnace.

The molten glass 10 which is to be divided into mold charges is confined in a suitable container such as a forehearth 11 forming an extension from the usual glass melting furnace, or which may be supplied with molten glass in any other convenient way. The forehearth is provided with a cover 12, and if desired, may also be provided with heat insulating packing or auxiliary heating means not shown. The bottom of the forehearth is provided with an outlet 13 which is always submerged in the glass.

The severing means employed for separating a mold charge from the gather suspended below the outlet may be of any desired type, but for the purpose of illustration there is shown a pair of cooperating shear blades 14, adjustably secured to the ends of slides 15 which are movable toward and from each other to cause the blades to sever the glass therebetween. The slides are supported and guided by anti-friction rolls 16 mounted in the columns of a bridge member 17, which surrounds the forehearth 11. Each slide 16 is actuated by a lever 18 pivoted on the bridge member at 19 and provided at its upper end with a roll 20 in operative relation with a cam 21. The cams are fixed on a shaft 22 mounted on bearings 23 on the top of the bridge member 17, of which one end is provided with a pulley 24, arranged to be driven by a belt connected with a suitable source of power. The cam rolls 20 are caused to follow the contours of the cams 21 by the action of the springs 25 as will be clearly apparent from Fig. 1.

The air pressure which controls the movement of the glass through the outlet 13 may be applied to the entire surface of the glass in the container, but it is preferred to limit the area to which abnormal pressures are applied by the use of a hollow cylinder or bell 30 of suitable refractory material, which passes through an opening in the cover 12 and has its lower end submerged in the glass above and opposite the outlet. The glass which is to be discharged through the outlet must first pass between the lower edge of the bell and the bottom of the container. In order that this passage of the glass may be controlled as to volume, means is provided for adjusting the bell vertically toward and from the outlet. For this purpose the top of the bell is provided with a perforated cap 31, secured to the flanged lower end of a tube 33 adjustably mounted within a sleeve 34, depending from a table 35 forming the top of the bridge member. This tube and the connected parts may be adjusted vertically by manipulation of handle 37 which turns a pinion (not shown) in mesh with a rack 36 formed on one side of the tube. The tube is locked in adjusted position by a hand nut 38, which clamps the pinion shaft against rotation. It will be observed that the bell may be adjusted vertically without disturbing its connection with the interior of the sleeve 34, so that varying air pressures applied to the upper end of the sleeve will always be transmitted to the interior of the bell. The usual packing may be employed, if desired, to make an air tight sliding connection between the tube 33 and the interior of the sleeve 34.

The shape of the gather formed below the outlet 13 may be controlled within certain limits by variation in the air pressure within the bell, which produces a corresponding variation in the rate of extrusion, and thereby varies the diameter of that particular portion of the gather to which the glass is being delivered.

In the illustrated embodiment of the invention the air pressures, which term is to be understood throughout the specification and claims to include pressure above or below normal atmospheric pressure, unless otherwise limited by the context, are produced by a generator or pump comprising a cylinder 43 and a cooperating piston 44. The piston is reciprocated by a piston rod 45, slidingly mounted in a bearing 46 in which it may be splined to prevent rotation. Movement is imparted to the piston rod through an adjustable collar 47, a link 48 and a lever 50. The lever is pivotally mounted on a bracket 51 and carries a roll in the path of a cam 52. This path is of such shape as to produce a full movement of the piston, preferably with a dwell at each end of the stroke.

To adjust the length of stroke of the piston, the lever 50 is slotted and its effective length may be varied by moving the end of the link 48 in the slot, in which position it is held by a hand nut 53. It is desirable that the piston shall come to the same place at the bottom of the cylinder, whatever may be the length of its stroke, therefore, the slot in the lever 50 is shown as arcuate on a radius struck about the pivot on the collar 47 when the piston is at the bottom of the cylinder. This position may be varied, however, by adjusting the collar 47 on the piston rod 45.

The reciprocation of the piston alternately builds up pressure and vacuum in accordance with the shape of the path on the cam 52 and this pressure is communicated to the interior of the sleeve 34 and thence to the bell 30, by pipes 56 and 57 (Fig. 2). For the purpose of independently relieving the pressures in the bell and thus adjusting the duration of each pressure, the air conduit is connected with a port controlled by two automatically actuated valves. As illustrated, a pipe 58 is connected with the sleeve through the pipe 57, and branches 59 and 60 lead respectively to valves 61 and 62. These valves are opened at the desired time to permit the pressure in the system to return to normal, by cams 63 and 64, each of which is angularly adjustable about the shaft 22.

The valves 61 and 62 are employed, one to relieve or reduce compression and the other to relieve or reduce vacuum, and as the construction of the two valves is identical, but one need be described. Each valve comprises a fixed casing 77 bored to receive a sliding plunger 78, and having air passages in its opposite sides. The pipes 59 and 60 connect with the respective air passages of the two casings. (Fig. 2.) Each plunger is provided with a cooperating port 65 which at times is moved into alignment with the air passages of its casing, so as to permit the passage of air to or from the pipe. Each plunger is connected at its forward end to a lever 66 pivotally mounted on the casing 77 and provided with a roll 67 on its upper end. This roll is held against its cooperating cam 63 or 64 by a spring 68, the arrangement being such that the rise of the cam causes the port 65 in the plunger 78 to be brought into alignment with the pipe and the pressure in the system to be equalized.

The valve actuating cams are mounted on the shaft 22 and driven by a common form of adjustable driving connection. For the purpose of permitting adjustment of the cam, it is loosely mounted on the shaft 22 and is rigidly connected with a bevel gear 69. This gear meshes with a bevel pinion 70, loosely mounted on a stud projecting from a collar 71, in mesh with a second bevel gear 72 rigidly mounted on the shaft 22. By this construction the pinion 70 is rotated by the gear 72 and therefore drives the gear 69 in the opposite direction. The angular relation between the two gears is adjusted by turning the collar 71 about the shaft 22 which is accomplished by providing the collar with a segmental gear 73 in mesh with a worm 74 which may be turned by a hand wheel 75. Thus by turning the hand wheels controlling the valves, the cams may be positioned to open the air system to atmosphere at any desired time, and thus vary the duration of both compression and vacuum.

It may be desirable at times to adjust the speed with which normal pressure is restored after any abnormal pressure. For this purpose each of the valve casings 63 is provided with a throttle valve 76 controlling the air passages on the opposite side of and in alignment with the pipe 59 and 60. When the plunger is moved to open the system to atmosphere, the rapidity with which air is permitted to escape or to enter the system depends upon the adjustment of the corresponding throttle valve, which can be regulated to secure the desired rapidity in the restoration of normal pressure, and therefore the desired abruptness of variation in the diameter of the gather.

For certain purposes it may be desirable that the rapidity with which abnormal pressure is transmitted to the glass shall be capable of variation from that determined by the shape of the path in the cam 52. In such cases, the modification shown in Fig. 4 may be employed. In this figure the cylinder 43 is connected with the sleeve 34 by two conduits or pipes 80 and 81. The conduit 81 includes a check valve 82 arranged to permit the passage of air in the direction of the arrow only, and a throttle valve 83. The conduit 80 includes a check valve 84 and a throttle valve 85, the check valve working in the opposite direction, so as to permit the passage of air in the direction of its arrow only. By this construction, when pressure is built up within the cylinder, it is transmitted to the surface of the glass through the pipe 81, and the speed with which it is transmitted may be varied by adjusting the valve 83. In a like manner, when a vacuum is built up within the cylinder, its effect is transmitted to the glass through the pipe 80 and the rate at which it is transmitted may be adjusted by the throttle valve 85.

It is desirable that means be provided to permit variation of the time of severing the mold charge relative to the time of forming the gather. As the formation of the gather is controlled by the cam 52, (although it may be further adjusted by the cams 63 and 64,) provision is made for varying the angular relation of the pump actuating cam 52 with respect to the shear cams 21. For this purpose the cam 52 has formed integral therewith a bevel gear 86 which is loosely mounted on the shaft 22 and is driven through an adjustable geared driving connection identical with those described in connection with the valves 61 and 62. This connection is adjusted by the hand wheel 87 which varies the angular position of the came 52 on its shaft, and therefore varies its timing with relation to the shear cams 21.

A typical operation of this apparatus is as follows:

In the position shown in Fig. 1 the pump has just finished its vacuum stroke, and the pressure in the system has been returned to normal by the opening of the valve 62 at a time determined by the setting of its cam 64. This restores atmospheric pressure within the bell, and permits a slight extrusion of the glass under the influence of gravity. The pump next starts its compression stroke which builds up a pressure in the system in accordance with the shape of the path of the cam 52, and when this pressure has been exerted for a sufficient time to produce the desired extrusion, it is relieved by the opening of the valve 61 in accordance with the setting of its cam 63. At about the time that the pump completes its compression stroke, the shears operate to sever a mold charge from the suspended gather. This time may be adjusted by manipulation of the hand wheel 87 to vary the angular position of the pump actuating cam 52. In some cases it is desirable that a slight intrusive impulse may be imparted to the glass before severing, in which case the adjustment would be such that the piston will begin its vacuum stroke just before the severing takes place. It will be apparent that the relative time of the cessation of pressure and the creation of vacuum with relation to the severing operation can all be independently adjusted by means of the hand wheels 75 and 87. The construction set forth provides means for independently adjusting the duration of each pressure, and means for adjusting the relative time of occurence of the severing operation, all of which should be adjusted by the operator in accordance with the particular character of the glass being handled, and the shape and size of the mold charge desired.

When the modification shown in Fig. 4 is employed, the rate at which pressure is transmitted from the pump to the bell may be adjusted by manipulation of the valve 83 which controls the transmission of compression and the valve 85 which controls the transmission of vacuum. The rate at which normal atmospheric pressure is restored after the application of vacuum is determined by the setting of one of the throttle valves 76 and in a similar manner the rate of restoring normal pressure after the application of compression is determined by the setting of the other throttle valve 76. By adjustment of these valves the abruptness with which the diameter of the mold charge is changed may be varied.

The nature and scope of the present invention having been indicated and the preferred embodiment of the invention having been specifically described, what is claimed as new is:—

1. In an apparatus for separating molten glass into mold charges, the combination of a glass container having a submerged outlet, an air pump, a conduit to transmit air pressure from the pump to the surface of the glass, means for actuating the pump, and means operative in timed relation with the pump for relieving the pressure formed thereby.

2. In an apparatus for separating molten glass into mold charges, the combination of a glass container having a submerged outlet, an air pump, a conduit to transmit air pressure from the pump to the surface of the glass, a valve to open the conduit to the atmosphere, means to actuate the pump and means to actuate the valve.

3. In an apparatus for separating molten glass into mold charges, the combination of a glass container having a submerged outlet, an air pump, a conduit to transmit air pressure from the pump to the surface of the glass, a plurality of valves to open the conduit to the atmosphere, means to actuate the pump and means for successively actuating the valves in timed relation with the actuation of the pump.

4. In an apparatus for separating molten glass into mold charges, the combination of a glass container having a submerged outlet, an air pump, a conduit to transmit air pressure from the pump to the surface of the glass, means for actuating the pump to produce alternate compression and vacuum, valves to open the conduit to the atmosphere and means for actuating a valve in timed relation with each pressure.

5. In an apparatus for separating molten glass into mold charges, the combination of a glass container having a submerged outlet, an air pump, a conduit to transmit air pressure from the pump to the surface of the glass, means for actuating the pump, a plurality of valves for relieving the pressure in the conduit, means for actuating the valves in timed relation to the actuation of the pump and independent means to permit adjustment of the time of actuation of each valve.

6. In an apparatus for separating molten glass into mold charges, the combination of a glass container having an outlet, pressure generating means, a conduit connecting the pressure generating means and the glass, by which impulses are transmitted to the glass in the outlet, and independent means for limiting the duration of the application of pressure to the glass.

7. In an apparatus for separating molten glass into mold charges, the combination of a glass container having an outlet, pressure generating means, a conduit connecting the pressure generating means and the glass, by which impulses are transmitted to the glass in the outlet, independent means for limiting the duration of the application of pressure to the glass, and means to permit adjustment of the pressure limiting means.

8. In an apparatus for separating molten glass into mold charges, the combination of a glass container having a submerged outlet, an air pump, a conduit to transmit air pressure from the pump to the surface of the glass, means for actuating the pump, means operative in timed relation with the pump for relieving the pressure formed thereby, and adjustable means for determining the rate at which the pressure is relieved.

9. In an apparatus for separating molten glass into mold charges, the combination of a glass container having a submerged outlet, a reciprocating air pump arranged to create pressure and vacuum on alternate strokes, a conduit connecting the pump and the surface of the glass, a pressure relieving valve and a vacuum relieving valve in the conduit, a cam for opening each valve, means for relatively adjusting the cams, and means for independently adjusting the rate at which normal pressure is restored by each valve.

10. In an apparatus for separating molten glass into mold charges, the combination of a glass container having a submerged outlet, a pump, a conduit between the pump and the surface of the glass in the container for transmitting pressure thereto, a valve to relieve the pressure in the conduit, means for opening the valve to relieve the pressure on the glass, means for severing a mold charge from a mass of glass suspended from the outlet, and means to permit relative adjustment of the time of actuation of the valve and the severing means.

Signed at Toledo, Ohio, this 14th day of July, 1920.

KARL E. PEILER.

Witnesses:
L. N. LOVELAND,
WM. H. HONISS.